(12) United States Patent
Bettendorff et al.

(10) Patent No.: US 8,548,025 B2
(45) Date of Patent: Oct. 1, 2013

(54) METHODS AND SYSTEMS FOR DISTRIBUTING BROADCAST MESSAGES ON VARIOUS NETWORKS

(75) Inventors: John Bettendorff, San Francisco, CA (US); Chris Calvert, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 853 days.

(21) Appl. No.: 12/636,128

(22) Filed: Dec. 11, 2009

(65) Prior Publication Data
US 2011/0075704 A1  Mar. 31, 2011

Related U.S. Application Data

(60) Provisional application No. 61/247,110, filed on Sep. 30, 2009.

(51) Int. Cl.
*H04B 1/00* (2006.01)

(52) U.S. Cl.
USPC .......................................... 375/133; 375/139

(58) Field of Classification Search
USPC .................................. 375/133, 139
See application file for complete search history.

(56) References Cited

FOREIGN PATENT DOCUMENTS
EP  1 986 367 A1  10/2008
WO  WO 2008/033514 A2  3/2008

OTHER PUBLICATIONS

PCT/US2010/050355, "International Preliminary Report on Patentability", Apr. 12, 2012, 9 pages.
International Application No. PCT/US2010/050355, International Search Report and Written Opinion mailed on Feb. 28, 2011, 12 Pages.
European Patent Application No. 10763543.5; Communication Pursuant to Rules 161(1) and 162; 2 pages, May 8, 2012.
European Patent Application No. 10763543.5; Communication of Publication Number and Information; 1 page; Jul. 11, 2012.
NZ598859, "First Examination Report", Nov. 9, 2012, 2 pages.
Mexican Patent Application No. MX/a/2012/003506, Office Action, mailed Aug. 1, 2013, 2 pages, (No English translation available).

*Primary Examiner* — Juan A Torres
(74) *Attorney, Agent, or Firm* — Kilpatrick Townsend & Stockton LLP

(57) ABSTRACT

Methods and systems for sending a broadcast message in frequency hopping and other systems. Instead of sending a complete message separately to each device, a relatively small packet or "chirp" is sent. These chirps are either targeted at known devices or sent in a manner to sweep the RF band. Devices that hear the chirps get information about the channel and/or time that the broadcast data will be sent. These devices then listen for the broadcast data as instructed, e.g., at the specified time on the specified channel. A system may alternatively, or in addition, use a scheduled hopping sequence break as a broadcast moment. Such a broadcast moment can be scheduled to periodically interrupt the node hopping sequences so that, at such times, many or all nodes are scheduled to be on the same channel for potential broadcasts.

15 Claims, 3 Drawing Sheets

METHODS AND SYSTEMS FOR DISTRIBUTING BROADCAST MESSAGES ON VARIOUS NETWORKS

RELATED APPLICATION

This document claims the benefit of U.S. Provisional Application Ser. No. 61/247,110, entitled "Methods and Systems for Broadcasting in a Frequency Hopping Network" and filed Sep. 30, 2009, the entire contents of which are incorporated by this reference.

FIELD

This disclosure relates generally to improved radio communication, including methods and systems used in frequency hopping networks and advanced metering infrastructure (AMI) systems, among other environments.

BACKGROUND

Radio communication-based networks are widespread and used for a variety of applications. Such networks are commonly employed in AMI systems that measure, collect, and/or analyze utility usage from electricity, gas, water, and other meters through various communication media. In these and other networks, some messages may be sent as broadcasts, i.e., sent to two or more recipients simultaneously. Broadcast messages may be intended for ultimate receipt by most or all nodes of the network. In an AMI system, for example broadcast messages may be used to send load shedding, new rate, and other generally-applicable information. Regardless of the purpose, broadcasting a message typically involves a transmitter sending a message and one or more devices receiving the message at roughly the same time.

"Broadcasting" a message involves sending a message to two or more potential recipients simultaneously. Unlike broadcasting on a wire or a single channel radio frequency ("RF") system which can be relatively simple, broadcasting messages on many frequency hopping systems can be difficult. Since recipient devices can be on different channels at any point in time, such devices will not receive the same broadcast message. Since devices in a frequency hopping network can be on different channels, such sending needs to be repeated for different devices on different frequencies. In many circumstances, the time required to send and resend a broadcast type message with acknowledgement is too time consuming to be practical. Additional issues complicate broadcasting on frequency hopping systems. Various regulations may further restrict the broadcasting options available in frequency hopping networks, for example, by preventing the uneven use of channels. Additionally, it is generally desirable that the addition of any broadcast capabilities that are added to a system will have minimal impact on regular (i.e., non-broadcast) transmissions.

SUMMARY OF THE INVENTION

Various techniques for sending a broadcast message quickly and efficiently in frequency hopping and other networks are disclosed. Instead of sending a complete message separately to each device in the network, a relatively small packet or "chirp" is sent. These chirps are either targeted at known devices or are sent in a manner to sweep the radio frequency ("RF") band. Devices that hear the chirps will typically receive information about the channel and/or time that the actual broadcast data will be sent. These recipient devices will then listen for the broadcast data as instructed, e.g., at the specified point in time on the specified channel.

One exemplary embodiment uses a device with data storage for storing a broadcast message to be distributed to recipient devices. The device also has transmission hardware for distributing the broadcast message to the recipient devices by sending a chirp packet and then the broadcast message. The chirp packet indicates to any recipient devices receiving the chirp packet that the broadcast message will be sent subsequently. For example, the chirp packet may identify a channel on which the broadcast message will be sent, a time at which the broadcast message will be sent, and/or provide information that allows recipient devices to avoid receiving duplicate broadcast messages. In one embodiment, these devices are part of a frequency hopping network in which nodes of the network communicate based on one or more frequency hopping sequences. The device may send the chirp packet on multiple (and possibly every) channel used on the frequency hopping network.

Another exemplary embodiment is a method that involves receiving a broadcast message at a first device for distribution to recipient devices. A chirp packet is then sent to potential recipient devices indicating that a broadcast message will be sent subsequently. The broadcast message is then sent on a channel and time to which the chirp packet recipients will be listening.

Yet another embodiment involves a mesh network having a plurality of devices configured to communicate using a frequency hopping sequence. A first device of the plurality of devices is configured to store and send a broadcast message and send a chirp packet indicating that the broadcast message will be sent subsequently. The first device may be configured to sweep a frequency hopping sequence with the chirp packet, i.e., to send the chirp packet on each channel of the frequency hopping sequence. A second device of the plurality of devices is configured to receive the chirp message, and, in response to chirp message, listen for the broadcast message on a first channel different from a second channel specified by the frequency hopping sequence. The first device may have received the broadcast message in a variety of ways. In one embodiment, the first device receives the broadcast message by periodically listening on a channel not specified by the first device's frequency hopping sequence. At least some of the plurality of devices may then send chirp packets indicating to any recipient devices that the broadcast message will be sent subsequently. Additional techniques and combinations of techniques for distributing a broadcast message may also be used.

These embodiments are mentioned to provide examples and aid understanding. Additional embodiments and advantages are also discussed in the Detailed Description and will become readily apparent to those skilled in the art. As will be realized, the invention is capable of other and different embodiments, and its several details are not essential, but rather are capable of modifications in various obvious respects, all without departing from the invention. Accordingly, the drawings and description are to be regarded as illustrative in nature, and not as restrictive.

BRIEF DESCRIPTION OF THE FIGURES

The above described and other features, aspects, and advantages of the present disclosure are better understood when the following Detailed Description is read with reference to the accompanying drawings, wherein.

DETAILED DESCRIPTION

Figure 1:
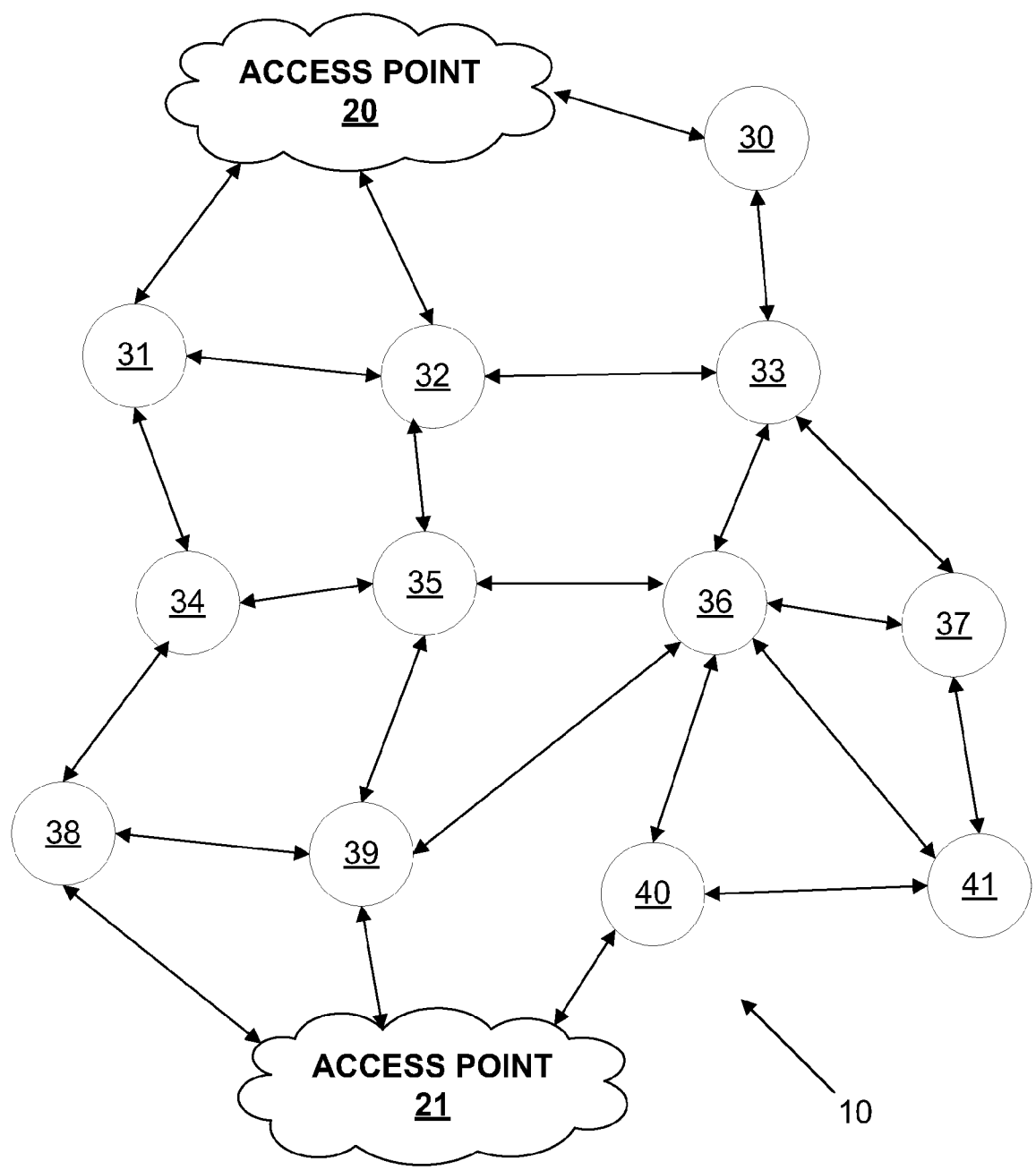
FIG. 1 is a system diagram illustrating an exemplary network environment.

FIG. 1 is a system diagram illustrating an exemplary network environment. Other embodiments may involve alternative networks and systems. The network 10 shown in FIG. 1 comprises access points 20, 21 and other devices, referred to herein as nodes 30-41. The nodes 30-41 work together to create a mesh network in which each node generally comprises a radio that can speak to and respond to neighboring radio devices of neighboring nodes. In the case of an AMI system, each such node may comprise or connect to an endpoint device such as a utility meter or appliance, or may not itself comprise or connect to an endpoint device. Thus, generally, a node may interact with an endpoint device, act as part of the network, or both, and may do so simultaneously. The radio of each node may have a programmable logic controller (PLC)—like device. Such a device can enable the radio to function like a small computer, carrying out appropriate computing and command functions. Thus intelligence in some or all of the radios may be used to delegate and distribute commands throughout the network 10. The radio may, but need not necessarily, allow two-way communication.

As an example of a utility monitoring network, each node of network 10 that comprises or connects to an endpoint may collect information about utility consumption at that endpoint and send such information through the network 10 to an access point 20, 21, where it may be collected by a utility company, for example, for billing and/or monitoring purposes. As a more specific example, an endpoint device radio may generate a packet of data that is transmitted to some destination, such as an access point destination. The packet may be addressed to the destination and entered into the network. The data packet traverses the network by being sent from radio to radio (node to node) in the direction of the destination-addressed radio. The route chosen for traversing the network may be dynamic and/or may employ routing. Generally, the network 10 will attempt to minimize the number of hops to increase transmission speed.

The radio and/or other components at a node of the network may be battery-powered, line-powered, or powered by any other suitable power source and attached via any suitable connection. Nodes will also generally comprise a time-keeping component such as a crystal oscillator.

Figure 2:
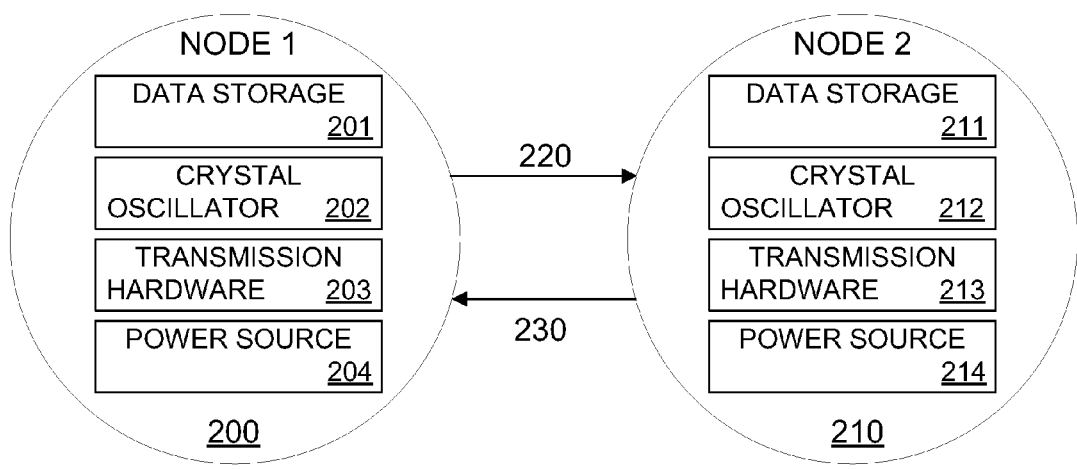
FIG. 2 is a flow diagram showing communication between nodes of an exemplary network.

FIG. 2 is a flow diagram showing exemplary communication between nodes 200, 210. The first node 200 comprises a data storage component 201, a crystal oscillator 202, transmission hardware 203 such as a radio, and a power source 204 such as a battery or AC connection. Similarly, the second node 210 also comprises a data storage component 211, a crystal oscillator 212, and transmitter 213 such as a radio, and a power source 214 such as a battery or AC connection. The first node 200 may receive messages and send those messages to other nodes, such as the second node 210, using the transmission hardware 203, for example, after temporarily storing, using, and even modifying such messages in the data storage component 201. The first node 200 may also generate new messages, such as chirp messages, and send such messages to the second node 210 and/or other neighboring nodes. The second node 210 may also be configured to receive and send messages.

Figure 3:
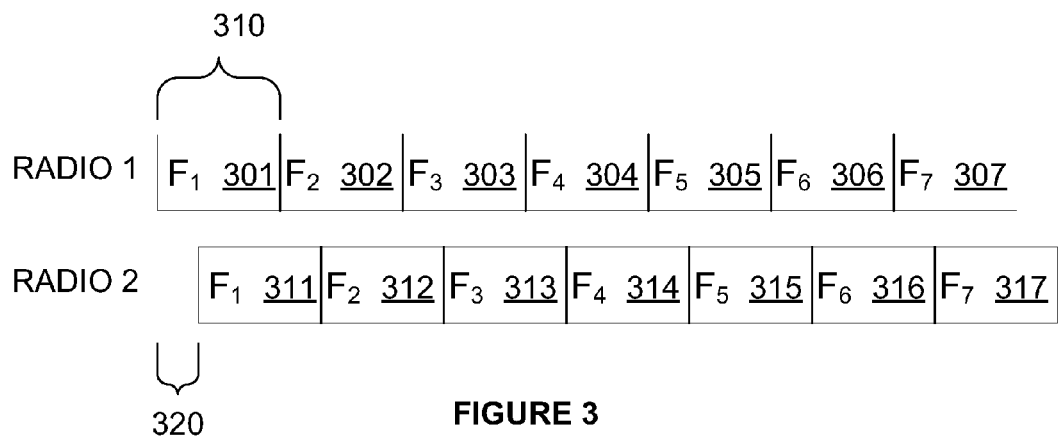
FIG. 3 is an illustration of exemplary differences in hopping sequence between two radios.

FIG. 3 is an illustration of exemplary differences in hopping sequences between two radios. The radios utilize a multi-channel communication scheme which is supported by accurate time-keeping at each radio node. At any given point in time, a radio is going through its hopping sequence. For example, RADIO 1 of FIG. 3 has a hopping sequence of frequencies $F_1$ 301, $F_2$ 302, $F_3$ 303, $F_4$ 304, $F_5$ 305, $F_6$ 306, $F_7$ 307 and RADIO 2 has a similar sequence of frequencies $F_1$ 311, $F_2$ 312, $F_3$ 313, $F_4$ 314, $F_5$ 315, $F_6$ 316, $F_7$ 317. Each block of the hopping sequence represents an increment of time or dwell time 310, for example, 700 milliseconds, in which the radio will receive over a given channel or on a given frequency. In some circumstances, the respective hopping sequences of different radios may be synchronized.

However, radios may hop out of synchronization with neighboring nodes and may even hop according to independent hopping sequences. For example, FIG. 3 illustrates that the hopping sequence of RADIO 1 is slightly out of sync with the hopping sequence of RADIO 2. Thus, a frequency hopping system may be employed that does not keep all radios in-sync as they move through the hopping sequence. Additionally, a first radio's hopping sequence may be different from a second radio's hopping sequence. Allowing radios to hop independently may provide advantages with respect to using the entire spectrum efficiently. A radio may, however, track where each of its neighboring radios are in their own hopping sequences.

Certain embodiments disclosed herein facilitate the sending of broadcast messages in frequency hopping networks, advanced metering infrastructure (AMI) systems, and other systems. Various techniques may be used to send a broadcast message quickly and efficiently in a frequency hopping system. In some embodiments, a relatively small packet or "chirp" is sent to provide channel and/or time information about a broadcast message that will subsequently be sent. These chirps are either targeted at known devices or are sent in a manner to sweep the RF band (i.e., to many or all of the frequencies used). Devices that hear the chirps will receive information about the channel and/or time that the actual broadcast data will be sent. These recipient devices will then listen for the broadcast data as instructed, e.g., at the specified point in time on the specified channel.

A chirp is a small packet that contains a minimal amount of information and is considerably smaller than the subsequent broadcast message that it announces. Sending the chirps first instead of the broadcast message can provide various efficiencies. A chirp may be sent to many or all of the different frequencies employed by a frequency hopping system. Such sending can be referred to as sending a "sweep," i.e., a message that sweeps most or all frequencies that are used. For example, a device may receive a broadcast and send a corresponding chirp on each frequency that is used on the network. In circumstances in which the chirp is smaller than the subsequent broadcast message, sending the chirps first to sweep the frequencies and then sending one or a few broadcast messages (i.e., on fewer of the frequencies) can be more efficient than sending the broadcast message itself on more frequencies. Another advantage of targeting the hopping sequence is that a device is now targeting all devices that are out there, which can improve scaling.

In alternative embodiments, chirps can be sent in other ways instead of sweeping the frequencies. A combination of sweep-based and non-sweep-based chirp distribution techniques can also be used. Some nodes may send sweep-based chirps and other nodes may send chirps in other ways. For example, some or all nodes can simply send chirps to known device recipients. If the number of known nodes is close to, or exceeds, the number of channels in the hopping sequence, then it may be better to target the hopping sequence with the chirps rather than the individual nodes. Generally, chirps are send in advance of the broadcast messages they announce and can be sent in a variety of ways.

One exemplary embodiment provides a method of communicating with multiple radio devices to inform those radio devices that a broadcast packet will be sent, so that the radio devices will listen on a specified channel at a specified time when the broadcast packet is sent. In one embodiment, the chirp is referred to as a rapid fire tickle no acknowledgement ("no ack") packet and is sent to "n" target devices. Such a chirp may identify the channel that the broadcast packet will be transmitted on and/or the time at which transmission will occur. A chirp is preferably, but not necessarily, made as small as possible to facilitate sending several chirps in a short time period. For example, the LAN address of the sender may not be important and thus, in some circumstances, is not included.

Generally, a chirp packet can be as simple as a 1 byte message that identifies itself as a chirp packet. Based on this information, a recipient device can retrieve information about a subsequent broadcast message. For example, the recipient device may interpret the chirp packet to determine that a broadcast message will occur at a next interval of a preconfigured interval and on a particular channel. Alternatively, the chirp packet may provide various other combinations of information used by recipient devices to facilitate receiving the subsequent broadcast packet. For example, the chirp may expressly identify a particular channel and/or a particular time for the broadcast message. Additionally, a chirp may provide information that can be used to determine whether the broadcast message has already been received by the chirp recipient.

Figure 4:
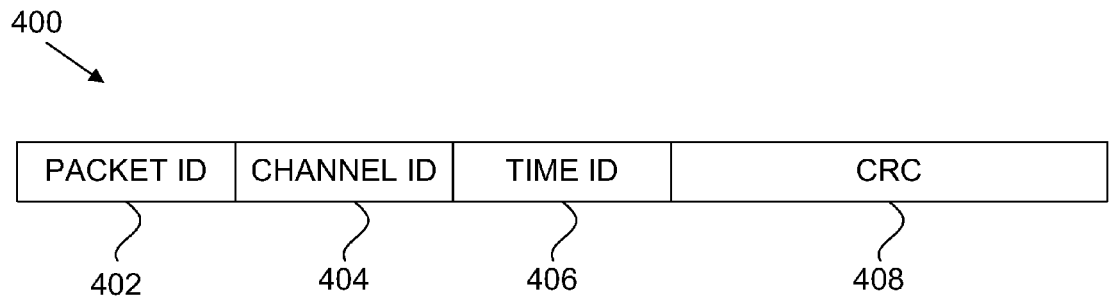
FIG. 4 is an illustration of an exemplary chirp packet.

As shown in FIG. 4, an exemplary chirp packet 400 comprises a packet identifier 402, a channel identifier 404 specifying on which channel the subsequent broadcast packet will be transmitted, a time identifier 406 specifying the time or time range the subsequent broadcast packet will be transmitted, and a CRC 408 of other information (e.g., source address, message ID, fragment number, etc.). If the packet identifier is 1 byte, the channel identifier is 1 byte, the time identifier is 1 byte, and the CRC is 2 bytes, and the 5 byte packets are transmitted at 9600 baud, each will take about 20 milliseconds. This estimate accounts for the overhead to get on the channel, ramp up the RF power and put out the required low level characters to properly identify the message. The device allocates a fixed amount of time for sending the chirps. After sending the chirps, the device sends the actual data packet, i.e., the broadcast message, at an appropriate subsequent time. In one example, a device spends up to 500 milliseconds sending the chirp packets, which at 9600 baud allows up to 25 chirps.

At 9600 baud, it can take about 225 milliseconds to send a 100 byte packet from one radio to another. In one example, in the time it takes to transmit 3 broadcast packets to specific target devices, the same device could send 25 chirps and the actual data packet to a multitude of devices. It may have increased its chances 8 times or more over simply sending the packet directly. The number of devices that could actually hear the data is limited only by the number of actual devices that can hear the radio's RF signal.

Generally, among other things, a chirp may include information about the slot or channel on which a subsequent broadcast packet will be sent, the maximum time until the subsequent broadcast packet is sent, baud rate, e.g., in 32 millisecond increments, and a packet ID (e.g., as part of a Layer 3 CRC). A hopping sequence slot can be used in place of actual channel information. For example, a transmitter and receiver can look the slot up in their hopping sequence and map it to a physical channel. The packet ID and/or other information such as LAN, Message ID, and Fragment IDS may be used for duplicate checking.

Following the distribution of chirps, broadcast packets can be sent in accordance with the information provided by the chirp. In one embodiment, a broadcast packet may be sent once as a data no ack packet since a recipient device may have many opportunities to hear a broadcast packet. Since the device only needs to receive the broadcast packet once, after the device has heard the broadcast packet, subsequent chirps can be ignored. A chirp may identify the broadcast packet so that the receiver can identify if it has already been received. As one example, a packet ID field described above can be used to identify if a packet has been heard before.

Using chirps followed by a broadcast message can provide significant improvement with respect to the speed and efficiency of distributing a broadcast message. As one example, if the window for sending chirps is 480 milliseconds, at 20 milliseconds per chirp and at 9600 baud, 24 attempts can be made to send the chirp, followed by roughly 160 milliseconds to send the 100 byte broadcast packet as a data no ack packet. While the success rate would probably not be 100%, a radio could make 3 or 4 passes and stop, and the recipient devices could then pass the message on to their own targets. In a relatively dense network, every radio in the network will likely have many opportunities to receive the broadcast packet. Additional speed and efficiency can be achieved by increasing the baud rate, for example, to 38400 baud or greater.

In a dense network, steps can be taken to avoid interference. Recipients may not be able to hear an actual broadcast packet where there is a high probability that one of the other devices is sending a chirp packet on the same channel. These types of issues can be addressed in various ways. For example, data in the chirp message can be used to select a subset of the number of channels in the hopping sequence rather than forcing all recipients to use a single channel. Only those channels that are in that subset will be targeted for distributing the message. In another example, chirps packets can be transmitted on one set of channels and the broadcast packets can be transmitted on a different set. The physical channels can be divided into four groups. In one embodiment, two bits from a Layer 3 Message ID field can be used to decide which group of channels to use. This allows the radio to have equal usage of channels and may facilitate satisfying Federal Communications Commission ("FCC") and other requirements. The packet can then be transmitted on a channel that is, for example, 2 away from the chirp. For example, if the 2 bits of the Message ID are 01, chirps can go out on physical channels: 904.1, 904.5, 904.9, etc., and data packets can go out on a channel that would be 2 away from this: 904.3, 904.7, 905.1, etc. A transmitter may determine what channel a node is currently on. If it is on a channel that is in the active group, a chirp is sent. If not, it moves on to the next node. The transmitter may also pick the channel for the data transmission based on the active group plus 2 technique. Generally, to comply with requirements for using channels evenly over time, something in the broadcast packet that changes can be used to choose channels.

Certain embodiments provide various techniques to determine how and to whom chirps will be sent. For example, if the packet is destined for collocated radios, then only collocated radios will be targeted. As another example, a radio can be flagged to target radios based on node rank, e.g., only radios with Node Rank 0 & 1. As yet another example, a radio can target only nodes on an active node list. If there are many nodes, it may be more efficient to just send to the various frequencies used in the hopping sequence (i.e., sweep the hopping sequence), rather than target individual nodes. Thus, with all of the above examples, if the number of potential nodes is greater than the number of channels in the hopping sequence (or a fixed number as may be appropriate), then chirps can be sent across the hopping sequence instead of to individual nodes.

After receiving a chirp packet, a recipient radio can keep the chirp packet to check for duplicate messages. This history, in one embodiment, is maintained based on the chirp packet's time to live field, which is the amount of time that a receiving radio will keep a packet before discarding it. In another embodiment, the chirp message history is limited to a maximum number of messages.

Figure 5:
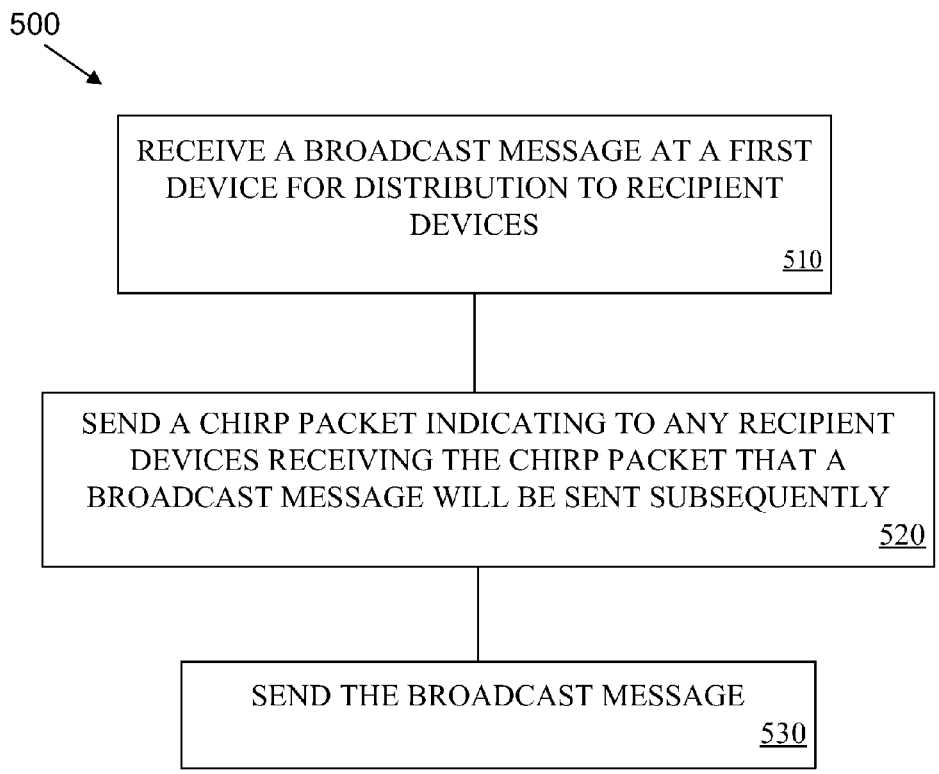
FIG. 5 is a flow chart illustrating an exemplary method of using a chirp packet to indicate that a broadcast message will be subsequently sent.

FIG. 5 is a flow chart illustrating an exemplary method 500 of using a chirp packet to indicate that a broadcast message will be subsequently sent. Exemplary method 500 involves a first device distributing a broadcast message to a plurality of recipient devices. For example, the first device and the recipient devices may be a part of a frequency hopping network in which nodes of the network communicate based on one or more frequency hopping sequences and the broadcast message may be a message that is intended for receipt by all nodes of the network.

The method 500 comprises receiving a broadcast message at a first device for distribution to recipient devices, as shown in block 510. The first device may have received the broadcast message in a variety of ways. In one embodiment, the first device receives the broadcast message by periodically listening on a channel not specified by the first device's frequency hopping sequence. This type of periodic transmitter broadcast moment distribution technique is described in greater detail below.

The method 500 further comprises sending a chirp packet indicating to any recipient devices receiving the chirp packet that a broadcast message will be sent subsequently, as shown in block 520. The chirp packet may identify a channel on which the broadcast message will be sent and a time at which the broadcast message will be sent. The chirp packet may also provide information that allows recipient devices to avoid receiving duplicate broadcast messages. For example, it may provide a broadcast message identifier that the recipients can use to compare to determine whether a broadcast message has already been received.

In the case of a frequency hopping network, the first device sends the chirp packet on each channel used on the frequency hopping network. This type of sweep can help ensure that many of the potential recipients become aware of the subsequent sending of the broadcast message, regardless of where in a frequency hopping sequence those recipients may be.

After sending the chirp packet, the method 500 further comprises sending the broadcast message, as shown in block 530. In the case of a particular channel and particular time window, the first device will send the broadcast packet on the appropriate channel at the appropriate time. While some embodiments utilize the various chirp and/or channel sweeping techniques described above, other embodiments may additionally or alternatively use various periodic transmission techniques.

Periodic Transmitter Broadcast Moment

An additional or alternative broadcasting technique particularly useful in frequency hopping networks involves a periodic transmitter "broadcast moment," which is a periodically scheduled break from the use of hopping sequences. A broadcast moment can be scheduled to interrupt the hopping sequences so that, at such times, some or all of the nodes are scheduled to be on the same channel for potential broadcasts. Such a periodic transmitter provides a way to send a packet to a large audience quickly. For example, once a second, each node may go to a specified channel and broadcast if there is a broadcast message to broadcast. The specified channel may change over time so that channels are used evenly. There is a potential cost to this type of technique, since, for example, recipients may stop a current activity every second to listen. This cost can be addressed by broadcasting less frequently. Alternatively or in addition, this cost can be addressed by configuring the nodes to only send and/or listen if the node is not busy. Thus, while using such a broadcast moment may not have a high success rate, it can provide a relatively fast mechanism to send a broadcast to a large group all at once.

The interval to perform a periodic transmitter broadcast moment can be determined to fit the circumstances of the particular system in which the technique is used. In a frequency hopping system generally, since every device in the network must stop and listen at times based on the interval length, the shorter the interval, the more time all radios are off channel and not available for normal communication. In addition, the periodic transmitter may put excessive RF noise into the system. If the broadcast transmitter transmits a packet on every broadcast cycle, then that noise has to be factored in as extra load on the system.

Periodic broadcast transmission may be appropriate in various circumstances. For example, some devices may communicate with thousands of other devices (e.g., routers), many of which may be able to hear but not transmit back. A system can be configured so that each broadcast packet gets a fixed number of chances, e.g., five chances, to be broadcasted before it is discarded. For example, a packet "mood" which has no value during a broadcast, can be used to specify how many attempts a periodic transmitter should make for the packet. Periodically, e.g., every 2 hours, the transmitter may put a maintenance packet on the broadcast queue to be transmitted. This can be used to allow the receivers to refresh their delta tick, among other things. If a radio is in the middle of receiving or transmitting a packet, the device can miss the broadcast. For a receiver, this should be insignificant since it may have multiple chances to receive the message. Similarly, for transmitters, this is not an issue as long as they do not miss several in a row.

The interval of the broadcast cycle may be determined to allow an appropriate amount of broadcast listen time. In one exemplary system, a 5 second interval requires that every radio that is listening will have to stop once every 7 channels of their hopping sequence and listen for 75 milliseconds for each interval. In this example, this amounts to about 1.5% of its time. However, if required to listen to every broadcast moment, a radio may have to set aside additional receive time to guarantee that it is not busy when the broadcast moment arrives. Thus, to ensure that an interval is not missed, regular activity may be stopped for a greater percentage of the device's time, which may be unacceptable for some purposes. For example, listening for extended intervals at every broadcast moment could amount in more than 10% of a device's regular receive time being lost. If a radio is not required to listen to every transmit, however, the radio is tied up for a smaller time intervals and only used from such messages when the device is not tied up with regular activity.

A receiving device may start receiving a fixed amount of time, e.g., 25 milliseconds, before the expected broadcast time to account for potential drift. Similarly, time, e.g., another 25 milliseconds, can be added to give any incoming packet time to start receiving. Once this time is up, the receiver will continue to receive only if a packet continues to be received. Once the receiver goes idle, the receiver returns to its normal hopping sequence.

In a periodic broadcast system, the transmitters may need to tell the other radios when and where the next transmission may occur. Devices that are set up to transmit may include this information, for example, in their acquisition sync packets and a few other key packets. Thus, when a device first boots up, if it acquires a periodic transmitter, the device gets that information right away.

In one exemplary embodiment, a 2-byte value indicates where in the transmitter's hopping sequence the next transmit will occur. This value can be in, as an example, 4 millisecond increments. If the receiver is tracking the other radio's delta tick, this value does not need to be refreshed, provided the receiver keeps moving it forward with each transmit interval. A 2-byte value can be used to indicate the interval between transmissions and can also be in 4 millisecond increments. This information is tacked onto the end of an acquisition sync, for example, using Layer 2 tag functionality. The data should be in the acquisition sync packet. In one example, to make it easy for the receivers to give up on a radio if they no longer can hear packets from it, the receivers are set up to dump a broadcast transmitter in favor of another one if they have not heard an acquisition sync in a given amount of time, e.g., in the last 24 hours. A receiver can latch onto the best transmitters, for example, based on received signal strength indication ("RSSI").

Moreover, a periodic transmitter broadcast moment technique can be used with the various chirp and/or channel sweeping techniques described above. For example, a periodic transmitter broadcast moment technique can be used to distribute a broadcast message to a large percentage (e.g., 50%) of the potential recipients and then each of those recipients can further distribute that message using the chirp and/or channel sweeping techniques. In a network, nodes can be configured with multiple broadcast message distribution algorithms. For example, a given node may be configured to send broadcast messages using either a chirp then broadcast message technique or a periodic transmitter technique. In a network, such as an AMI system, the routing infrastructure can be configured to use the periodic transmitter techniques and the meter nodes can be configured to use the chirp then broadcast techniques. Various combinations of techniques can be used, including combinations involving different techniques than are described herein. Generally, all distribution techniques provide some advantages and disadvantages. Those advantages and disadvantages, as well as considerations with respect to how much transmission/message success is required, can be used to select an appropriate combination of one or more distribution techniques.

GENERAL

The foregoing description of the embodiments of the invention has been presented only for the purpose of illustration and description and is not intended to be exhaustive or to limit the invention to the precise forms disclosed. The techniques of the invention are not limited to AMI systems, mesh networks, or any other particular network configuration. Thus, in general numerous modifications and adaptations are apparent to those skilled in the art without departing from the spirit and scope of the invention.

That which is claimed:

1. A device comprising:
    data storage for storing a broadcast message to be distributed to recipient devices, wherein the device and the recipient devices are part of a frequency hopping network in which nodes of the network communicate based on one or more frequency hopping sequences; and
    transmission hardware for distributing the broadcast message to the recipient devices by sending a chirp packet and the broadcast message, wherein the chirp packet indicates to any recipient devices receiving the chirp packet that the broadcast message will be sent subsequently, wherein the device is configured to send the chirp packet on multiple channels used on the frequency hopping network.

2. The device of claim 1 wherein the chirp packet identifies a channel on which the broadcast message will be sent and a time at which the broadcast message will be sent.

3. The device of claim 1 wherein the chirp packet provides information that allows recipient devices to avoid receiving duplicate broadcast messages.

4. The device of claim 1 wherein the device sends the chirp packet on each channel used on the frequency hopping network.

5. The device of claim 1 wherein the device and the recipient devices are part of a data collection system for collecting commodity consumption-related data.

6. The device of claim 2 wherein the chirp packet identifying the channel on which the broadcast message will be sent comprises identifying one channel of a frequency hopping sequence used by the device and the recipient devices.

7. The device of claim 2 wherein the chirp packet identifies a maximum time period within which the broadcast message will be sent.

8. A method comprising:
    receiving a broadcast message at a first device for distribution to recipient devices, wherein the first device and the recipient devices are part of a frequency hopping network in which nodes of the network communicate based on one or more frequency hopping sequences;
    sending a chirp packet, wherein the chirp packet indicates to any recipient devices receiving the chirp packet that a broadcast message will be sent subsequently, wherein the first device sends the chirp packet on multiple channels used on the frequency hopping network; and
    sending the broadcast message.

9. The method of claim 8 wherein the chirp packet identifies a channel on which the broadcast message will be sent and a time at which the broadcast message will be sent.

10. The method of claim 8 wherein the chirp packet provides information that allows recipient devices to avoid receiving duplicate broadcast messages.

11. The method of claim 8 wherein the first device sends the chirp packet on each channel used on the frequency hopping network.

12. A system comprising:
    a mesh network comprising a plurality of devices configured to communicate using one or more frequency hopping sequences;
    a first device of the plurality of devices configured to store and send a broadcast message and send a chirp packet, wherein the chirp packet indicates to any recipient devices receiving the chirp packet that the broadcast message will be sent subsequently wherein the first device is configured to send the chirp packet on multiple channels; and a second device of the plurality of devices configured to receive the chirp message, and, in response to chirp message, listen for the broadcast message on a first channel different from a second channel specified by its frequency hopping sequence.

13. The system of claim 12 wherein the first device sends the chirp packet on each channel of the frequency hopping sequence.

14. The system of claim 12 wherein the first device sends the chirp packet to targeted devices of which the first device is aware.

15. The system of claim 12 wherein the chirp packet identifies:
- a channel on which the broadcast message will be sent;
- a time at which the broadcast message will be sent; and
- information that allows recipient devices to avoid receiving duplicate broadcast messages.

* * * * *